US011873736B2

(12) United States Patent
Saboundji et al.

(10) Patent No.: US 11,873,736 B2
(45) Date of Patent: Jan. 16, 2024

(54) TURBINE PART MADE OF SUPERALLOY COMPRISING RHENIUM AND/OR RUTHENIUM AND ASSOCIATED MANUFACTURING METHOD

(71) Applicant: SAFRAN, Paris (FR)

(72) Inventors: Amar Saboundji, Moissy-Cramayel (FR); Alice Agier, Moissy-Cramayel (FR); Virginie Jaquet, Moissy-Cramayel (FR)

(73) Assignee: SAFRAN, Paris (FR)

( * ) Notice: Subject to any disclaimer, the term of this patent is extended or adjusted under 35 U.S.C. 154(b) by 178 days.

(21) Appl. No.: 17/415,082

(22) PCT Filed: Dec. 20, 2019

(86) PCT No.: PCT/FR2019/053254
§ 371 (c)(1),
(2) Date: Jun. 17, 2021

(87) PCT Pub. No.: WO2020/128394
PCT Pub. Date: Jun. 25, 2020

(65) Prior Publication Data

US 2022/0065111 A1 Mar. 3, 2022

(30) Foreign Application Priority Data

Dec. 21, 2018 (FR) ...................................... 1873972

(51) Int. Cl.
*F01D 5/28* (2006.01)
*C23C 28/00* (2006.01)
(Continued)

(52) U.S. Cl.
CPC ............ *F01D 5/288* (2013.01); *C22C 19/057* (2013.01); *C23C 10/28* (2013.01);
(Continued)

(58) Field of Classification Search
CPC ..... C23C 10/06; C23C 10/14; C23C 10/1618; C23C 10/26; C23C 10/28–34;
(Continued)

(56) References Cited

U.S. PATENT DOCUMENTS 4,526,814 A * 7/1985 Shankar .................. C23C 10/58 427/253
5,667,663 A * 9/1997 Rickerby ............ C23C 28/3215 205/228
(Continued)

FOREIGN PATENT DOCUMENTS

EP 1 652 965 A1 5/2006
EP 1 767 666 A2 3/2007
(Continued)

OTHER PUBLICATIONS

G. L. Erickson, "The Development and Application of CMSX-10", Retrieved from the Internet: https://www.tms.org/Superalloys/10.7449/1996/Superalloys_1996_35_44.pdf [retrieved on Nov. 22, 2019], Jun. 24, 2004, pp. 35-44, XP055645576.
(Continued)

*Primary Examiner* — Topaz L. Elliott
(74) *Attorney, Agent, or Firm* — Sughrue Mion, PLLC

(57) ABSTRACT

The present invention concerns a turbine part comprising a substrate made of nickel-based monocrystalline superalloy, comprising chromium and at least one element chosen among rhenium and ruthenium, the substrate having a γ-γ' phase, an average mass fraction of rhenium and of ruthenium greater than or equal to 4% and an average mass fraction of chromium less than or equal to 5% and preferably less than or equal to 3%, a sub-layer covering at least a part of a surface of the substrate, characterised in that the sublayer has a γ-γ' phase and an average atomic fraction of
(Continued)

chromium greater than 5%, of aluminium between 10% and 20% and of platinum between 15% and 25%.

7 Claims, 2 Drawing Sheets

(51) Int. Cl.
*C22C 19/05* (2006.01)
*C23C 10/28* (2006.01)

(52) U.S. Cl.
CPC ...... *C23C 28/3215* (2013.01); *C23C 28/3455* (2013.01); *F05D 2230/31* (2013.01); *F05D 2230/40* (2013.01); *F05D 2300/132* (2013.01); *F05D 2300/143* (2013.01); *F05D 2300/175* (2013.01); *F05D 2300/607* (2013.01)

(58) Field of Classification Search
CPC ....... C23C 10/54; C23C 10/58; C22C 19/057; F01D 5/288; F05D 2230/31; F05D 2230/90
See application file for complete search history.

(56) References Cited

U.S. PATENT DOCUMENTS

| | | | | | |
|---|---|---|---|---|---|
| 6,139,976 | A * | 10/2000 | Czech | C23C 10/28 | 427/256 |
| 7,247,393 | B2 * | 7/2007 | Hazel | C23C 30/00 | 428/650 |
| 9,777,583 | B2 * | 10/2017 | Leggett | C23C 10/02 | |
| 10,156,007 | B2 * | 12/2018 | Tang | C23C 10/20 | |
| 2001/0053424 | A1 * | 12/2001 | Schaeffer | C23C 10/60 | 427/253 |
| 2004/0048090 | A1 * | 3/2004 | Creech | C23C 26/00 | 428/670 |
| 2006/0046091 | A1 * | 3/2006 | Madhava | C23C 28/3455 | 428/689 |
| 2006/0093849 | A1 * | 5/2006 | Farmer | C23C 30/00 | 416/214 R |
| 2006/0210825 | A1 * | 9/2006 | Gleeson | C23C 4/08 | 148/428 |
| 2007/0071996 | A1 * | 3/2007 | Hazel | C23C 30/00 | 428/650 |
| 2009/0226613 | A1 * | 9/2009 | Gleeson | C23C 28/028 | 427/255.28 |
| 2010/0151125 | A1 * | 6/2010 | Kool | C23C 10/32 | 427/226 |
| 2010/0159136 | A1 * | 6/2010 | Lee | C23C 10/14 | 427/255.39 |
| 2014/0271220 | A1 * | 9/2014 | Leggett | F01D 5/3092 | 420/466 |
| 2017/0198382 | A1 * | 7/2017 | Tang | C23C 10/50 | |

FOREIGN PATENT DOCUMENTS

| | | | | | |
|---|---|---|---|---|---|
| EP | 1767666 | A3 | | 3/2007 | |
| EP | 1870485 | A1 | * | 12/2007 | C09D 183/04 |
| EP | 2 199 424 | A1 | | 6/2010 | |
| EP | 2 778 258 | A1 | | 9/2014 | |
| WO | 2007/008227 | A2 | | 1/2007 | |
| WO | 2007/008227 | A3 | | 1/2007 | |

OTHER PUBLICATIONS

International Search Report of PCT/FR2019/053254 dated Jun. 12, 2020 [PCT/ISA/210].
Search Report of FR1873972 dated Nov. 22, 2019.

* cited by examiner

[Fig. 1]
Prior art
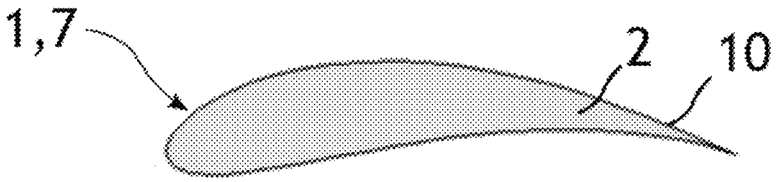
[Fig. 2]
Prior art
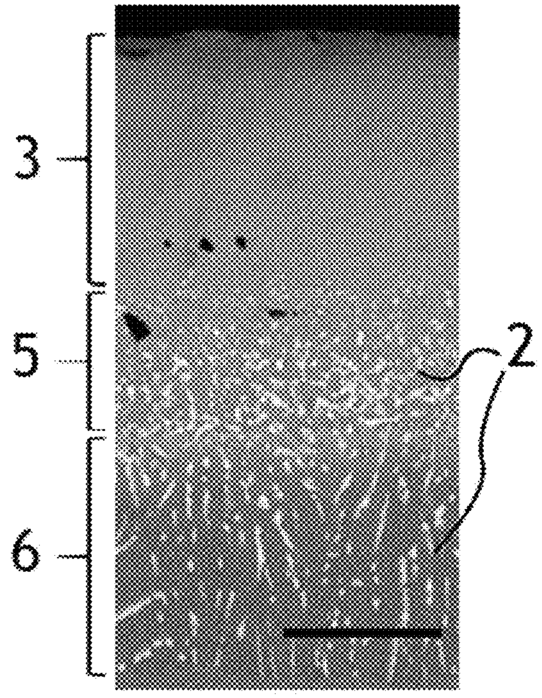
[Fig. 3]
Prior art
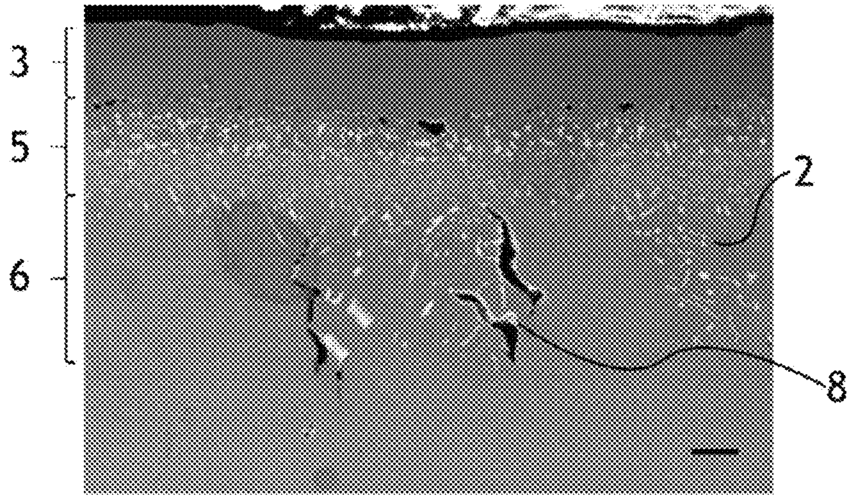

[Fig. 4]
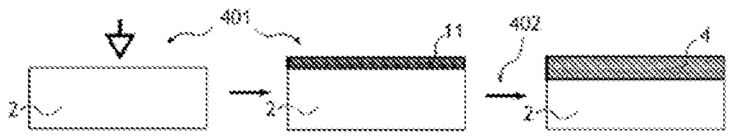
[Fig. 5]
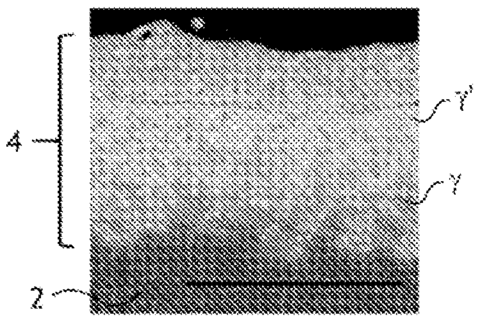
[Fig. 6]
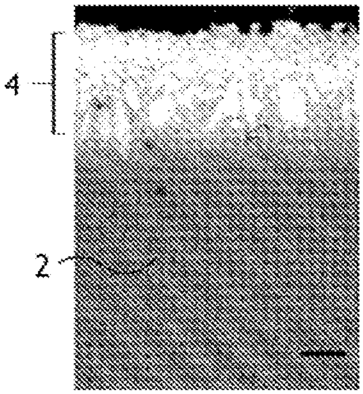

TURBINE PART MADE OF SUPERALLOY COMPRISING RHENIUM AND/OR RUTHENIUM AND ASSOCIATED MANUFACTURING METHOD

CROSS REFERENCE TO RELATED APPLICATIONS

This application is a National Stage of International Application No. PCT/FR2019/053254 filed on Dec. 20, 2019, claiming priority based on French Patent Application No. 1873972 filed on Dec. 21, 2018, the entire contents of each of which being herein incorporated by reference in their entireties.

FIELD OF THE INVENTION

The invention relates to a turbine part, such as a turbine blade or a nozzle vane for example, used in aeronautics.

PRIOR ART

In a turbojet engine, the exhaust gases generated by the combustion chamber can reach high temperatures, exceeding 1200° C. or even 1600° C. The parts of the turbojet engine in contact with these exhaust gases, such as the turbine blades for example, must be able to maintain their mechanical properties at these high temperatures.

To this end, it is known to manufacture certain parts of the turbojet engine in "superalloy". Superalloys are a family of high-strength metal alloys that can work at temperatures relatively close to their melting points (typically 0.7 to 0.8 times their melting temperatures).

It is known to introduce rhenium and/or ruthenium into a superalloy to increase its mechanical strength, in particular creep resistance, at high temperature. In particular, introducing rhenium and/or ruthenium increases the use temperature of these superalloys by about 100° C. compared with the first polycrystalline superalloys.

However, the increase in the average mass fraction of rhenium and/or ruthenium in the superalloy requires the average mass fraction of chromium in the superalloy to be reduced so as to maintain a stable allotropic structure of the superalloy, in particular a γ-γ' phase. The chromium in the superalloy promotes the formation of oxide $Cr_2O_3$, having the same crystallographic structure as $\alpha$-$Al_2O_3$ and thus allowing the formation of an $\alpha$-$Al_2O_3$ layer. This stable $\alpha$-$Al_2O_3$ layer helps to protect the superalloy against oxidation. Increasing the average mass fraction of rhenium and/or ruthenium therefore results in a lower oxidation resistance of the superalloy compared with a superalloy without rhenium and/or ruthenium.

In order to increase the thermal resistance of these superalloys and to protect them against oxidation and corrosion, it is also known to coat them with a thermal barrier.

FIGS. 1 to 3 schematically illustrate a cross-section of a turbine part 1 of the prior art, for example a turbine blade 7 or a nozzle vane. The part 1 comprises a substrate 2 of single-crystal metal superalloy covered with a coating 10, for example an environmental barrier comprising a thermal barrier.

The environmental barrier typically comprises a sublayer, preferably a metallic sublayer 3, a protective layer and a thermal insulation layer. The sublayer 3 covers the metallic superalloy substrate 2. The sublayer 3 is itself covered by the protective layer, formed by oxidation of the metallic sublayer 3. The protective layer protects the superalloy substrate 2 from corrosion and/or oxidation. The thermal insulation layer covers the protective layer. The thermal insulation layer may be made of ceramic, such as yttriated zirconia.

The sublayer 3 is typically made of simple nickel aluminide β-NiAl or platinum modified β-NiAlPt. The average atomic fraction of aluminum (comprised between 35% and 45%) of the sublayer 3 is sufficient to form exclusively a protective layer of aluminum oxide ($Al_2O_3$) to protect the superalloy substrate 2 from oxidation and corrosion.

However, when the part is subjected to high temperatures, the difference in nickel, and especially aluminum, concentrations between the superalloy substrate 2 and the metallic sublayer 3 leads to a diffusion of the different elements, in particular from the nickel in the substrate to the metallic sublayer, and from the aluminum in the metallic sublayer to the superalloy. This phenomenon is called "interdiffusion".

Interdiffusion can result in the formation of primary and secondary reaction zones (SRZ) in a portion of the substrate 2 in contact with the sublayer 3.

FIG. 2 is a microphotograph of the cross-section of a sublayer 3 covering a substrate 2 of a part 1. The microphotograph is taken before the part is subjected to a series of thermal cycles to simulate the temperature conditions of the part 1 during use. The substrate 2 is rich in rhenium, i.e., the average mass fraction of rhenium is greater than or equal to 0.04. It is known to use rhenium in the composition of superalloys to increase the creep resistance of superalloy parts. Typically, the substrate 2 has a γ-γ' phase, and in particular a γ-Ni phase. The sublayer 3 is of the β-NiAlPt type. The substrate 2 has a primary interdiffusion zone 5, in the part of the substrate directly covered by the sublayer 3. The substrate 2 also has a secondary interdiffusion zone 6, directly covered by the primary interdiffusion zone 5. The scale bar corresponds to a length equal to 20 μm.

FIG. 3 is a microphotograph of the cross-section of the sublayer 3 covering the substrate 2 of the part 1. The microphotograph shows the sublayer 3 and the substrate 2 after subjecting them to the series of thermal cycles described above. The sublayer 3 covers the substrate 2. The substrate 2 has a primary interdiffusion zone 5 and a secondary interdiffusion zone 6. The scale bar corresponds to a length equal to 20 μm.

The interdiffusion phenomena lead to a premature depletion of the aluminum sublayer, which promotes phase transformations in the sublayer (β-NiAl→γ'-$Ni_3Al$, martensitic transformation). These transformations modify the allotropic structure of the sublayer 3 and/or of the interdiffusion zones, and generate cracks 8, promoting the rumpling of the protective layer of aluminum oxide.

Thus, interdiffusions between the superalloy substrate 2 and the sublayer 3 can have harmful consequences on the service life of the superalloy part.

DISCLOSURE OF THE INVENTION

An aim of the invention is to propose a solution for effectively protecting a superalloy turbine part from oxidation and corrosion while increasing its service life, during use, as compared with known parts.

Another aim of the invention is to limit or prevent the formation of secondary reaction zones while allowing an aluminum oxide to be formed during use of the part.

Finally, another aim of the invention is to at least partially prevent the formation of cracks in the substrate of a part subjected to high-temperature conditions, for example above 1000° C., as well as the rumpling of the protective layer of aluminum oxide.

These aims are achieved in the context of the present invention by virtue of a turbine part, comprising:

a single-crystal nickel-base superalloy substrate, comprising chromium and at least one element selected from rhenium and ruthenium, the substrate having a γ-γ' phase, an average mass fraction of rhenium and ruthenium greater than or equal to 4% and an average mass fraction of chromium less than or equal to 5% and preferentially less than or equal to 3%, a sublayer covering at least part of a surface of the substrate, the part being characterized in that the sublayer has a γ-γ' phase and an average atomic fraction:

of chromium comprised between 5% and 10%, of aluminum comprised between 10% and 20%, and of platinum comprised between 15% and 25%.

The invention is advantageously supplemented by the following features, taken individually or in any technically possible combination thereof:

the sublayer has exclusively a γ-γ' phase, the sublayer has an average atomic fraction of silicon less than 2%, the sublayer has a thickness comprised between 5 μm and 50 μm, and preferentially comprised between 5 μm and 15 μm, a protective layer of aluminum oxide covers the sublayer, a ceramic thermal insulation layer covers the protective layer of aluminum oxide.

The invention also relates to a turbine blade comprising a part described above.

The invention also relates to a process for manufacturing a turbine part, comprising a single-crystal nickel-base superalloy substrate, comprising chromium and at least one element selected from rhenium and ruthenium, having a γ-γ' phase, an average mass fraction of rhenium and ruthenium greater than or equal to 4% and an average mass fraction of chromium less than or equal to 5% and preferentially less than or equal to 3%, a sublayer covering at least part of a surface of the substrate, the sublayer (4) having a γ-γ' phase and an average atomic fraction:

of chromium comprised between 5% and 10%, of aluminum comprised between 10% and 20%, of platinum comprised between 15% and 25%, the process comprising at least the steps consisting in:

a) depositing an enrichment layer on the substrate, the enrichment layer having at least an average atomic fraction of platinum greater than 90% and an average atomic fraction of chromium comprised between 3% and 10%, b) heat treating the assembly formed by the substrate and the enrichment layer so that the enrichment layer diffuses at least partially into the substrate.

The invention is advantageously supplemented by the following features, taken individually or in any technically possible combination thereof:

during step a) of depositing an enrichment layer, at least one chromium layer and one platinum layer are deposited separately, the chromium layer or layers having a total thickness comprised between 200 nm and 2 μm and the platinum layer or layers having a total thickness comprised between 3 μm and 10 μm, during step a) of depositing an enrichment layer, chromium and platinum are deposited simultaneously, during step b), the assembly formed by the substrate and the enrichment layer is heat treated at a temperature above 1000° C. for more than one hour, preferentially for more than 2 hours, the deposition of the enrichment layer is carried out by a method selected from physical vapor deposition, thermal spraying, electron beam evaporation, pulsed laser ablation and cathode sputtering.

DESCRIPTION OF THE FIGURES

Other features, aims and advantages of the invention will emerge from the following description, which is purely illustrative and non-limiting, and which should be read in conjunction with the appended drawings in which:

FIG. 1, already commented on, schematically illustrates a cross-section of a turbine part in accordance with the state of the art, for example a turbine blade or a nozzle vane.

FIG. 2 is a scanning electron microscopy photograph of the microstructure of a substrate and sublayer of the turbine part, before the part has been subjected to a series of thermal cycles.

FIG. 3 is a scanning electron microscopy photograph of the microstructure of a substrate and a sublayer of the turbine part, after the part has been subjected to a series of thermal cycles.

FIG. 4 schematically illustrates a process for manufacturing a part comprising a substrate and a sublayer, in accordance with an embodiment of the invention.

FIG. 5 is a scanning electron microscopy photograph of a substrate and a sublayer of the part, before the part has been subjected to a series of thermal cycles.

FIG. 6 is a scanning electron microscopy photograph of a substrate and a sublayer of the part, before the part has been subjected to a series of thermal cycles.

Throughout the figures, similar elements bear the same reference marks.

DEFINITIONS

The term "superalloy" refers to an alloy having, at high temperature and high pressure, very good resistance to oxidation, corrosion, creep and cyclic stresses (particularly mechanical or thermal stresses). Superalloys have a particular application in the manufacture of parts used in aeronautics, for example turbine blades, because they constitute a family of high-strength alloys that can work at temperatures relatively close to their melting points (typically 0.7 to 0.8 times their melting temperatures).

A superalloy can have a two-phase microstructure comprising a first phase (called "γ phase") forming a matrix, and a second phase (called "γ' phase") forming precipitates hardening in the matrix. The coexistence of these two phases is referred to as the γ-γ' phase.

The "base" of the superalloy refers to the main metal component of the matrix. In most cases, superalloys include an iron, cobalt, or nickel base, but sometimes also a titanium or aluminum base. The base of the superalloy is preferably a nickel base.

Nickel-base superalloys have the advantage of providing a good compromise between oxidation resistance, high-temperature fracture resistance and weight, which justifies their use in the hottest parts of turbine engines.

Nickel-base superalloys are made up of a γ phase (or matrix) of the γ-Ni face-centered cubic austenitic type, possibly containing additives in α (Co, Cr, W, Mo)-substituted solid solution, and a γ' phase (or precipitates) of the γ'-$Ni_3X$ type, with X=Al, Ti or Ta. The γ' phase has an ordered L12 structure, derived from the face-centered cubic structure, coherent with the matrix, i.e., having an atomic lattice very close thereto.

Due to its ordered nature, the γ' phase has the remarkable property of having a mechanical strength that increases with temperature up to about 800° C. The very strong coherence between the γ and γ' phases gives a very high mechanical strength to nickel-base superalloys, which itself depends on the γ/γ' ratio and the size of the hardening precipitates.

A superalloy is, in all the embodiments of the invention, rich in rhenium and/or ruthenium, i.e., the average mass fraction of rhenium and ruthenium in the superalloy is greater than or equal to 4%, increasing the creep resistance of the superalloy parts as compared with superalloy parts without rhenium. A superalloy is also, in all the embodiments of the invention, low in chromium on average, i.e., the average mass fraction in the entire superalloy of chromium is less than 0.05, preferentially less than 0.03. Indeed, chromium depletion during rhenium and/or ruthenium enrichment of the superalloy allows a stable allotropic structure of the superalloy to be maintained, in particular a γ-γ' phase.

The term "atomic fraction" refers to the molar fraction, i.e., the ratio of the quantity of matter of an element or group of elements to the total quantity.

The term "mass fraction" refers to the ratio of the mass of an element or group of elements to the total mass.

DETAILED DESCRIPTION OF THE INVENTION

FIG. 4 illustrates a process for manufacturing a part 1, comprising a substrate 2 and a sublayer 4. The substrate 2 used is of the type CMSX-4 plus (registered trademark) and has the chemical composition, in average atomic fraction, described in Table 1.

TABLE 1

| Cr | Co | Mo | Ta | W | Cb | Re | Al | Ti | Hf | Ni |
|---|---|---|---|---|---|---|---|---|---|---|
| 3.5 | 10 | 0.6 | 8 | 6 | 0 | 4.8 | 5.7 | 0.85 | 0.1 | Balance |

In a first step 401 of the process, an enrichment layer 11 is deposited on the substrate 2. The enrichment layer 11 has at least an average atomic fraction of platinum greater than 90% and an average atomic fraction of chromium comprised between 3% and 10%. The enrichment layer 11 comprises at least chromium and platinum, and preferentially chromium, platinum, hafnium and silicon. Preferentially, the enrichment layer 11 does not include nickel. The individual elements of the enrichment layer 11 may be alloyed.

The different elements of the enrichment layer 11 may be deposited simultaneously. The enrichment layer 11 may also comprise several superimposed layers: each element may be deposited separately. In particular, at least one layer of platinum and at least one layer of chromium can be deposited separately. In this case, the chromium layer or layers have a total thickness comprised between 200 nm and 2 μm and the platinum layer or layers have a total thickness comprised between 3 μm and 10 μm. Thus, the quantity of metals diffused during the process in accordance with an embodiment of the invention is optimized.

The deposition of the layer or layers forming the enrichment layer 11 can be carried out under vacuum, for example by a physical vapor deposition (PVD) process. Various PVD methods can be used to produce the enrichment layer 11, such as cathode sputtering, electron beam evaporation, laser ablation and electron-beam physical vapor deposition. The enrichment layer 11 may also be deposited by thermal spraying.

In a second step 402 of the process, the assembly formed by the substrate 2 and the enrichment layer 11 is thermally treated so that the enrichment layer 11 diffuses at least partially into the substrate 2. Thus, a sublayer 4 is formed on the surface of the substrate 2. The heat treatment is preferentially carried out for more than one hour at a temperature comprised between 1000° C. and 1200° C., preferentially for more than two hours at a temperature comprised between 1000° C. and 1200° C., and even more preferentially substantially four hours at a temperature comprised between 1050° C. and 1150° C.

In general, a sufficient quantity of platinum and chromium is deposited during step 401 so that, after heat treatment step 402, the average atomic fraction of platinum in the sublayer 4 is comprised between 15% and 25%, and so that the average atomic fraction of chromium in the sublayer 4 is greater than 5% and preferentially comprised between 5% and 20%. The quantity of platinum and chromium deposited in the enrichment layer 11 is therefore all the higher as the chromium and platinum atomic mole fraction of the substrate 2 is lower, which is typically the case for a substrate 2 enriched in rhenium and/or ruthenium.

The thickness of the enrichment layer 11 is preferentially comprised between 100 nm and 20 μm.

FIG. 5 is a scanning electron microscopy photograph of the microstructure of a substrate 2 and a sublayer 4 of a part 1. The sublayer 4 is produced by the process shown in FIG. 4, in which an enrichment layer 11 comprising only chromium and platinum is deposited during step 401 of the process. The scale bar in FIG. 5 corresponds to a length equal to 20 μm. The sublayer 4 has, in general, a γ-γ' phase and an average atomic fraction of chromium greater than 5%, preferentially comprised between 5% and 20%, of aluminum comprised between 10% and 20%, of platinum comprised between 15% and 25%. In particular, the sublayer 4 has an average atomic fraction of chromium substantially equal to 5.8%, an average atomic fraction of aluminum substantially equal to 11%, an average atomic fraction of platinum substantially equal to 21%, an average atomic fraction of hafnium less than 0.5% and an average atomic fraction of silicon less than 1%.

The sublayer 4 preferentially has exclusively a γ-γ' phase. Indeed, the introduction of elements into the substrate 2 by the enrichment process described above make it possible not to cause a phase transition of the substrate 2, and thus to avoid mechanical stresses in the substrate 2 that could lead to the appearance of cracks 8. A substantially horizontal line divides the sublayer 4 into two superimposed parts: this line corresponds to the boundary between the substrate 2 and the enrichment layer 11, prior to the heat treatment step 402 during the manufacture of a part 1.

The thickness of the sublayer 4 is typically comprised between 1 μm and 100 μm, and preferentially between 5 μm and 50 μm.

In particular, the average atomic fraction of chromium in the sublayer 4 helps to promote the formation of α-$Al_2O_3$ when the part is used in working conditions.

With reference to FIG. 6, the sublayer 4 helps prevent cracking during extended heat treatment, representative of working conditions in a turbine. The scale bar corresponds to a length equal to 20 μm. FIG. 6 is a scanning electron microscopy photograph of a part 1 comprising the substrate 2 and the sublayer 4, after the extended heat treatment. During the extended heat treatment, the part 1 is placed under air for 100 hours at 1050° C. and then for 10 hours at 1150° C. No cracks 8 are detectable in the substrate 2 after the extended heat treatment.

The invention claimed is:

1. A process for manufacturing a turbine part comprising a single-crystal nickel-base superalloy substrate and a sublayer, the single-crystal nickel-base superalloy substrate having a γ-γ' phase, comprising chromium with an average mass fraction of chromium less than or equal to 5%, and comprising at least one element selected from rhenium and ruthenium, with an average mass fraction of rhenium greater than or equal to 4% when there is no ruthenium, with an average mass fraction of ruthenium greater than or equal to 4% when there is no rhenium and with an average mass fraction of the total of rhenium and ruthenium greater than or equal to 4% when there is rhenium and ruthenium the sublayer covering at least part of a surface of the substrate, the sublayer having a γ-γ' phase and an average atomic fraction:

of chromium comprised between 5% and 10%, of aluminum comprised between 10% and 20%, of platinum comprised between 15% and 25%, wherein the process comprises at least the steps of:

depositing an enrichment layer on the substrate, the enrichment layer having at least an average atomic fraction of platinum greater than 90% and an average atomic fraction of chromium comprised between 3% and 10%, heat treating the assembly formed by the substrate and the enrichment layer so that the enrichment layer diffuses at least partially into the substrate.

2. The process as claimed in claim 1, wherein, during step a) of depositing an enrichment layer, at least one chromium layer and one platinum layer are deposited separately, the chromium layer or layers having a total thickness comprised between 200 nm and 2 μm and the platinum layer or layers having a total thickness comprised between 3 μm and 10 μm.

3. The process as claimed in claim 1, wherein, during step a) of depositing an enrichment layer, chromium and platinum are deposited simultaneously.

4. The process as claimed in claim 1, wherein the assembly formed by the substrate and the enrichment layer is heat treated at a temperature above 1000° C. for more than one hour.

5. The process as claimed in claim 1, wherein the deposition of the enrichment layer is carried out by a method selected from physical vapor deposition, thermal spraying, electron beam evaporation, pulsed laser ablation and cathode sputtering.

6. The process as claimed in claim 1, wherein the single-crystal nickel-base superalloy substrate has an average mass fraction of chromium less than or equal to 3%.

7. The process as claimed in claim 1, wherein the assembly formed by the substrate and the enrichment layer is heat treated at a temperature above 1000° C. for more than 2 hours.

* * * * *